UNITED STATES PATENT OFFICE.

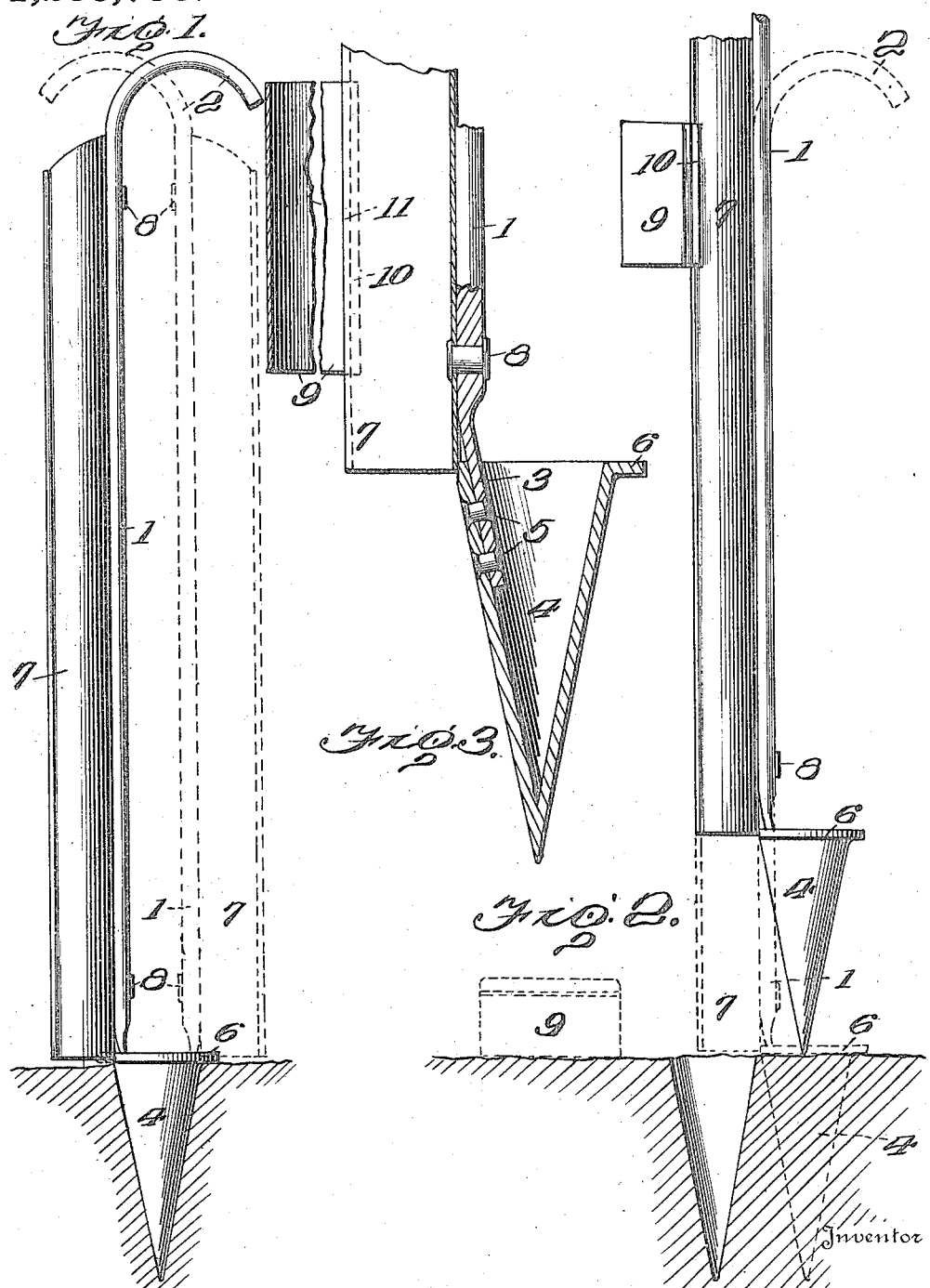

JOSEPH W. FRITTS, OF BRADFORD, PENNSYLVANIA.

TRANSPLANTING DEVICE.

1,238,756.     Specification of Letters Patent.     Patented Sept. 4, 1917.

Application filed August 29, 1916. Serial No. 117,454.

*To all whom it may concern:*

Be it known that I, JOSEPH W. FRITTS, a citizen of the United States, residing at Bradford, in the county of McKean and State of Pennsylvania, have invented certain new and useful Improvements in Transplanting Devices, of which the following is a specification, reference being had therein to the accompanying drawing.

My invention relates to improvements in transplanting devices, the primary object of which is to devise a tool of this character which is of simple construction, durable, cheap to manufacture and requiring but little manual effort to operate.

The device disclosed herein is provided with means for forming a hole in the soil to receive a plant, means for supporting a plant above the opening, means for dropping the plant into the hole, and means for placing dirt around the plant within the hole.

Other objects and advantages of the present improvement will be set forth in the following description and drawings in which:

Figure 1 is a side elevation of the device showing it in operation in forming a hole in the soil to receive a plant.

Fig. 2 is a fragmentary side elevation of the device showing it in the operation of placing a plant in the hole formed in the soil and showing in dotted lines the operation of the device in placing dirt around the transplanted plant.

Fig. 3 is a fragmentary vertical sectional view of the device.

Referring now to the drawings in which like reference numerals designate similar parts, 1 represents a straight metal rod approximately two and one-half feet long and curved at one end to form an operating handle 2. The rod 1 may be made of any other suitable material and its length may be varied without affecting the operation of the device or departing from the spirit or scope of the present invention. The other end of the rod 1, opposite to the handle 2 is formed band-shaped and bent at an oblique angle to form a member 3 to the outside of which is secured a hollow cone-shaped member or spade 4, by means of rivets 5, the member 3 extending within the spade 4. The upper edge of the spade 4 is turned over to form an annular flange 6, which is for the purpose of receiving the foot of the operator in forcing the spade 4 into the ground. To the outside of the rod 1 is secured a trough-shaped member 7, by means of rivets 8. The trough-shaped member 7 is of a length to extend between the upper edge of the spade 4 and the lower end of the handle 2. Attention is called to the fact that the members 4 and 7 are arranged so as not to be positioned one above the other, the member 7 being on the one side of the handle 2 and the spade 4 being beneath the said handle. Means are also provided for holding a plant within the trough-shaped member 7, these means comprising a short section of trough-shaped metal 9 having a longitudinal groove 10 on each edge of a size to fit on a bead 11 formed on each edge of the member 7. In operation the holding member 9 is slid up and down the trough-shaped member 7 for placing a plant within the hole formed by the spade.

In transplanting plants with my device, the operation is as follows:

The point of the spade 4 is put upon the spot where it is desired to set a plant in the ground and the spade forced into the soil by the operator placing his foot upon the outwardly turned rim 6. The spade is forced into the soil until the under side of the rim 6 is adjacent the surface thereof, at which time the conical spade 4 is rotated by means of the handle 2 (as is shown in dotted lines in Fig. 1) to pack the sides of the hole tight. The operator then places the point of the spade 4 at one side of the hole formed by it and turns the handle 2 until the end of the trough-shaped member 7 is directly over the hole, as is shown in Fig. 2. The plant suspended by its foliage, or stalk within the slidable member 9, is then slid down the trough-shaped member 7, the roots of the plant projecting below the member 9 so that when the said member has reached the end of the trough the roots of the plant will be within the hole formed by the spade. After the roots of the plant are within the hole the member 9 is slid farther down and off of the trough 7 to entirely discharge the plant from the device. The operator then again forces the spade 4 into the soil which throws dirt around the roots of the plant within the hole, thus completing the transplanting operation.

Having thus described my invention, what I claim and desire to secure by Letters Patent is:—

1. A transplanting device comprising a body portion, a spade carried thereby, and means for supporting a plant attached to the body portion, said means comprising two interlocking trough-shaped members.

2. A transplanting device comprising a body portion, a spade carried thereby, a trough-shaped member attached to the body portion and extending longitudinally thereof, and a member slidably mounted on the trough-shaped member.

3. A transplanting device comprising a body-portion, a spade carried thereby, and plant supporting means carried by the body portion, the said spade and plant supporting means so attached to the body portion that they are positioned on opposite sides thereof for the purpose described.

4. A transplanting device comprising a body portion, a spade carried by one end, an operating handle carried by the other end and means for supporting a plant attached to the body portion, said means comprising two trough-shaped members having interlocking beads on their edges.

5. A transplanting device comprising a rod, a spade attached to one end thereof, an operating handle attached to the other end thereof, a trough-shaped member attached to the said rod and extending longitudinally thereof, and a small trough-shaped member slidably mounted on the first mentioned trough-shaped member.

6. A transplanting device comprising a body-portion, plant supporting means carried thereby, and a spade carried by the body portion, said spade comprising a hollow conical body portion having its upper edge turned outwardly to form a lateral flange.

7. A transplanting device comprising a rod, a spade carried by one end thereof, an operating handle carried by the other end thereof, a trough-shaped member attached to the said rod, the said spade and trough-shaped member so attached to the rod that they are positioned on opposite sides thereof, and a second trough-shaped member slidably mounted on the first-mentioned trough-shaped member.

8. A transplanting device comprising a rod, a spade attached to one end thereof, said spade comprising a hollow conical body portion having its upper edge turned outwardly to form a lateral flange, an operating handle carried by the other end of the rod and means for supporting a plant attached to the said rod between the operating handle and the spade.

9. A transplanting device comprising a rod, a spade attached to one end thereof, said spade comprising a hollow conical portion having its upper edge bent to form a lateral flange, an operating handle carried by the other end of the rod and a trough-shaped member attached to the rod and extending longitudinally thereof and of a length to reach from the lateral flange on the spade to the lower end of the operating handle, said trough-shaped member having a beading formed on each of its longitudinally extending edges, and a second trough-shaped member having the same cross-section as the first mentioned trough-shaped member provided with grooves on its edges adapted to fit upon the beads formed on the edges of the first mentioned trough-shaped member.

In testimony whereof I hereunto affix my signature in the presence of two witnesses.

JOSEPH W. FRITTS.

Witnesses:
ROBERT L. ROBERTS,
IDA M. SHERIDAN.

Copies of this patent may be obtained for five cents each, by addressing the "Commissioner of Patents, Washington, D. C."